United States Patent
Bansal

(10) Patent No.: US 11,699,334 B2
(45) Date of Patent: *Jul. 11, 2023

(54) QUANTUM COMPUTING-BASED VIDEO ALERT SYSTEM

(71) Applicant: Bank of America Corporation, Charlotte, NC (US)

(72) Inventor: Gaurav Bansal, Kondapur (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/682,025

(22) Filed: Feb. 28, 2022

(65) Prior Publication Data
US 2022/0358819 A1 Nov. 10, 2022

Related U.S. Application Data

(63) Continuation of application No. 17/307,642, filed on May 4, 2021, now Pat. No. 11,295,583.

(51) Int. Cl.
| | |
|---|---|
| *G08B 13/00* | (2006.01) |
| *G06K 9/62* | (2022.01) |
| *G06V 20/40* | (2022.01) |
| *G06V 20/52* | (2022.01) |
| *H04N 7/18* | (2006.01) |
| *G06V 10/80* | (2022.01) |

(Continued)

(52) U.S. Cl.
CPC ........... *G08B 13/00* (2013.01); *G06K 9/6288* (2013.01); *G06V 20/41* (2022.01); *G06V 20/48* (2022.01); *G06V 20/49* (2022.01); *G06V 20/52* (2022.01); *H04N 7/183* (2013.01); *G10L 25/51* (2013.01)

(58) Field of Classification Search
None
See application file for complete search history.

(56) References Cited

U.S. PATENT DOCUMENTS

| | | |
|---|---|---|
| 7,092,496 B1 | 8/2006 | Maes et al. |
| 7,194,752 B1 | 3/2007 | Kenyon et al. |

(Continued)

OTHER PUBLICATIONS

Yue Ruan, et al. "Quantum Image Processing: Opportunities and Challenges", Mathematical Problems in Engineering, visited on May 4, 2021 at <https://doi.org/10.1155/2021/6671613> vol. 2021, Article ID 6671613, 8 pages, 2021.

(Continued)

*Primary Examiner* — Hung Q Dang
(74) *Attorney, Agent, or Firm* — Banner & Witcoff, Ltd.

(57) ABSTRACT

A quantum computing based video alert system converts captured video and audio signals, in real time, into a sequence of video qubits and a sequence of audio qubits. An entanglement score is generated based on a comparison of the video qubits to historical video qubits that are verified to show malicious activity. A second entanglement score is generated based on a comparison of the audio qubits to historical audio qubits that are verified to show malicious activity. A probability score is generated for each segment of the video qubit sequence and for each segment of the audio qubit sequence. If the probability score for the video qubit sequence, the audio qubit sequence, or a combination of probability scores for both the video qubit sequence and the audio qubit sequence meet a threshold, then an alert is generated to identify possible malicious activity at the location of a CCTV camera capturing the real-time data.

20 Claims, 4 Drawing Sheets

(51) Int. Cl.
    *G08B 29/18*     (2006.01)
    *G10L 25/51*     (2013.01)

(56) References Cited

U.S. PATENT DOCUMENTS

| | | |
|---|---|---|
| 7,567,876 B2 | 7/2009 | Gulati |
| 9,380,161 B2 | 6/2016 | Dunsmuir |
| 10,573,313 B2 | 2/2020 | Mishra et al. |
| 10,963,125 B2 | 3/2021 | Gupta et al. |
| 2004/0093202 A1 | 5/2004 | Fischer et al. |
| 2017/0323543 A1 | 11/2017 | Glaser |
| 2017/0330029 A1 | 11/2017 | Turcot et al. |

OTHER PUBLICATIONS

Norbert M. Linke, et al., "Experimental comparison of two quantum computing architectures" PNAS visited on Mayh 4, 2021 at <https://doi.org/10.1073/pnas.1618020114> Mar. 28, 2017 114 (13) 3305-3310; first published Mar. 21, 2017.

US 11,699,334 B2

QUANTUM COMPUTING-BASED VIDEO ALERT SYSTEM

CROSS REFERENCE TO RELATED APPLICATIONS

This application is a continuation of and claims priority to patent application Ser. No. 17/307,642 entitled "Quantum Computing-Based Video Alert System" filed on May 4, 2021, which is incorporated by reference in its entirety.

BACKGROUND

Organizations utilize video and/or audio capture devices to monitor facilities and/or locations at least for security purposes. For example, organizations may install and/or monitor large numbers of video images and/or streams and/or audio recordings and/or streams, such as those captured by still cameras, video cameras, microphones, closed circuit television (CCTV) cameras and/or other such devices capable of capturing live video, recorded video, still images and/or audio recordings or streams. In some cases, such video and/or audio capture devices may be capable of continuously capturing still images, video recordings, audio recordings and/or streaming video and/or audio. Organizations may have large installed base of cameras and/or microphones that may include a large number of live feeds from CCTV cameras located at facilities and/or customer access points (e.g., near cash registers, entrances, exits, automated teller machines, and the like). Because a large amount of data is being captured, full real time analysis of these video, image, and/or audio data is impossible. For example, a single camera may generate at least 2.5 million frames/day with or without a corresponding audio feed. Current computing systems are limited in processing power, such that they lack automatic capability to analyze, identify and alert for any potential criminal or other nefarious activity captured through live streams.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

A quantum computing based video alert system converts captured video and audio signals, in real time, into a sequence of video qubits and a sequence of audio qubits. An entanglement score is generated based on a comparison of the video qubits to historical video qubits that are verified to show malicious activity. A second entanglement score is generated based on a comparison of the audio qubits to historical audio qubits that are verified to show malicious activity. A probability score is generated for each segment of the video qubit sequence and for each segment of the audio qubit sequence. If the probability score for the video qubit sequence, the audio qubit sequence, or a combination of probability scores for both the video qubit sequence and the audio qubit sequence meet a threshold, then an alert is generated to identify possible malicious activity at the location of a CCTV camera capturing the real-time data.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
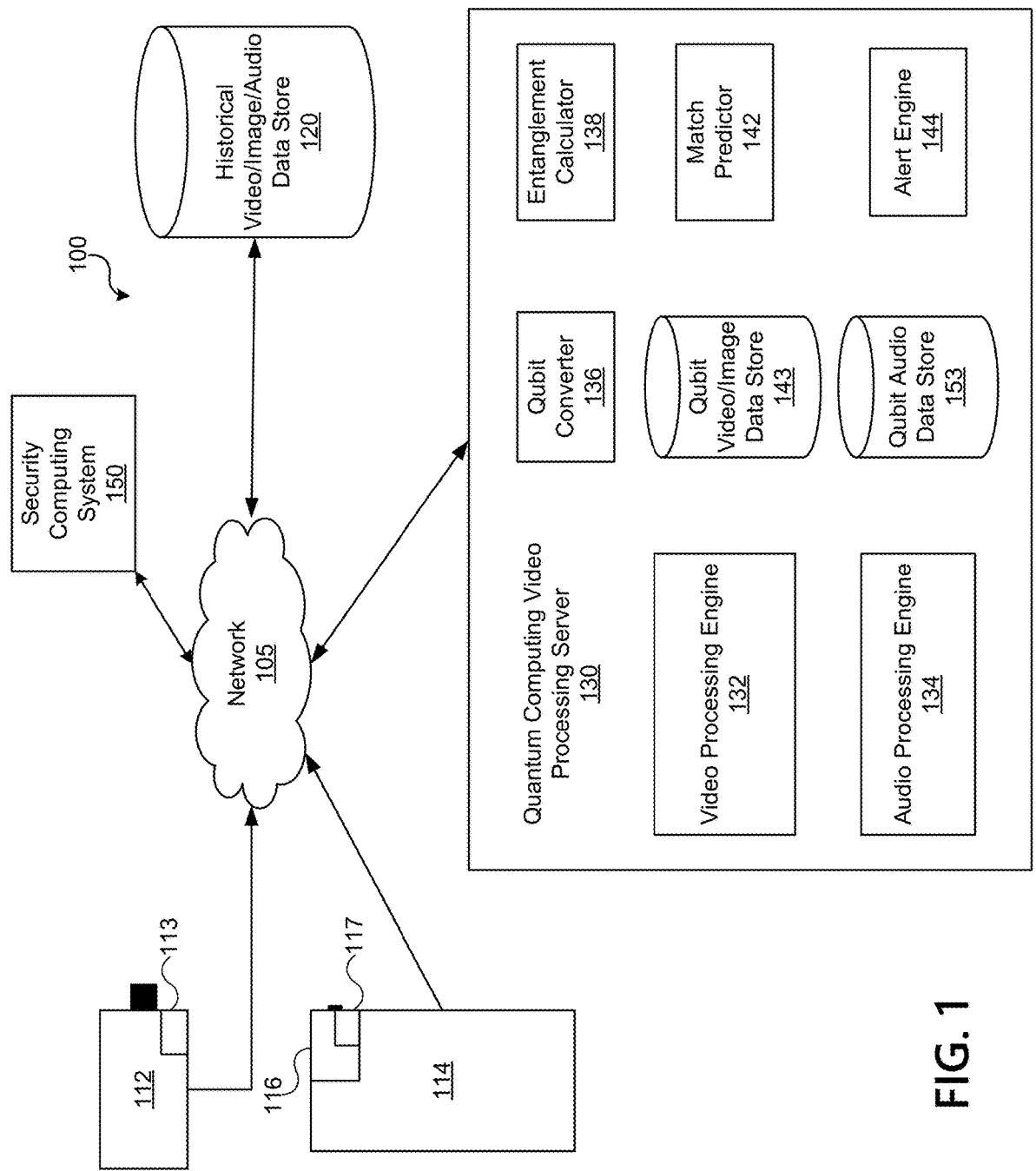
FIG. 1 shows an illustrative computing environment implementing a quantum computing-based video alert system in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (i.e., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some example arrangements in which the systems described herein may be used. Various other arrangements employing aspects described herein may be used without departing from the innovative concepts described.

FIG. 1 shows an illustrative computing environment implementing a quantum computing-based video alert system 100 in accordance with one or more aspects described herein. In some cases, the quantum computing-based video alert system 100 may include a quantum computing video processing server 130 communicatively coupled via a network 105 to one or more image capturing devices, video capturing devices, and/or audio capture devices, such as the video cameras 112, 116. The quantum computing-based video alert system 100 may further include one or more data stores storing historical or otherwise previously captured video, audio and/or image files and associated information.

Business organizations, enterprise organizations, educational institutions, government agencies and the like may monitor facilities, locations, devices for security purposes and to prevent and/or provide evidence of criminal and/or malicious activities. To do so, one or more still cameras, video cameras, microphones or other sensors may be installed to allow for monitoring of facilities or other locations to capture evidence of criminal or malicious activities. For example, a video camera 112 (e.g., a CCTV camera) may be installed at a location to capture a video stream (or a series of images) and an audio stream (or a series of audio clips) via a microphone 113. In some cases, an organization may install a video camera 116 and/or a microphone 117 to capture an image sequence, a video stream and/or an audio stream at a location near a device 114, such as an automated teller machine, vending machine, and/or other self-service transaction device. Information captured by the video cameras 112, 116 may be communicated to a central location for processing and/or analysis. In some cases, raw video may be stored in a data store with or without additional information, such as a time and date of capture, location information, audio information (e.g., volume, amplitude, and the like) and/or other such information and metadata. For example, a data store 120 may store captured or other historical video, image and/or audio files captured by the video cameras 112, 116 or other similar devices at different locations. In some cases, the data store 120 may store additional metadata that provides information whether the video, audio and/or image file information is associated with confirmed criminal or malicious activity. The video, audio and/or image file metadata may be added or updated by the quantum computing video processing server 130 based on whether the quantum computing-based image and/or audio analysis indicates that at least a portion of a video stream, audio clip, or image sequence includes information indicative of criminal or malicious activity. Additionally, the video, audio or image file metadata may include probability score information, entanglement score information or other such information describing a likelihood that criminal or malicious activity has been captured in the video stream, audio stream and/or image sequence. In some cases, feedback may be received from an external security computing system 150 after additional investigation has been performed to update the metadata with confirmation that the video file, audio file and/or image file has captured an indication of confirmed criminal or malicious activities. For example, the file metadata may include a flag that can be set after confirmation and/or a probability score can be increased above a threshold level or set to 100%.

The quantum computing video processing server 130 may include a video processing engine 132, an audio processing engine 134, a qubit converter 136, an entanglement calculator 138, a match predictor, an alert engine 144 and/or one or more data stores, such as a qubit video/image data store 143 and a qubit audio data store 153. Further, the quantum computing video processing server 130 may include one or more components and/or features as discussed below with respect to FIGS. 3 and 4. For example, the quantum computing video processing server 130 may store instructions in memory that, when processed by a processor, enable the quantum computing video processing server 130 to provide functionality of the video processing engine 132, the audio processing engine 134, the qubit converter 136, the entanglement calculator 138, the match predictor, the alert engine 144 and/or store, modify or retrieve information to/from the qubit video/image data store 143 and the qubit audio data store 153. The quantum computing video processing server 130 may analyze video, image, and/or audio information captured by still cameras, video cameras, microphones, closed circuit television (CCTV) cameras and/or other such devices capable of capturing live video, recorded video, still images and/or audio recordings or streams. In some cases, the quantum computing video processing server 130, when enabled, may cause one or more video capture devices to begin capturing video.

Figure 2:
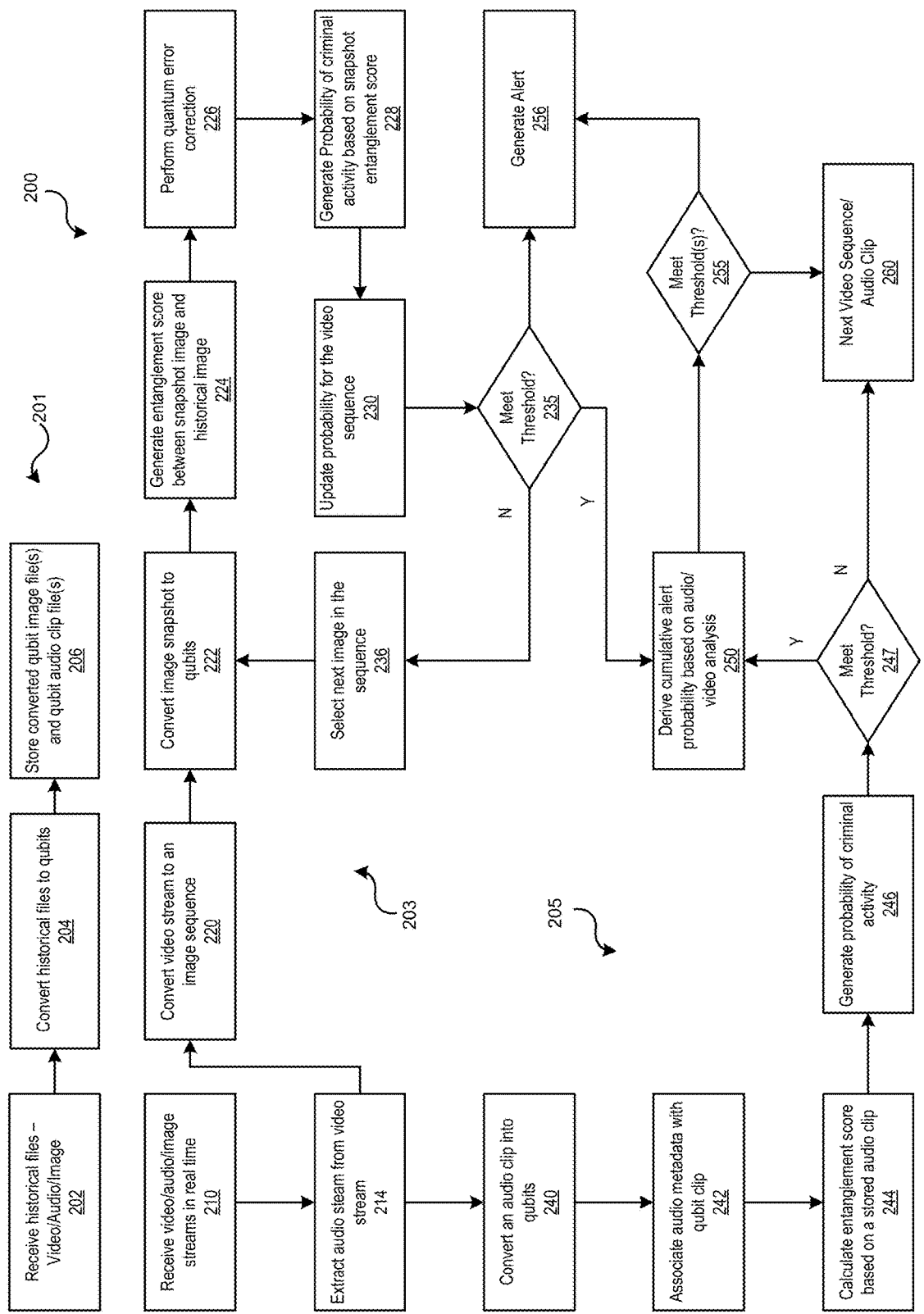
FIG. 2 shows an illustrative process flow for performing quantum computing-based video analysis and alert generation in accordance with one or more aspects described herein.

The quantum computing video processing server 130 may receive or otherwise access live or real-time audio/video/image feeds via the network 105 from one or more remote devices, such as the video cameras 112, 116. Once received, the quantum computing video processing server 130 may separate an audio signal or feed from a video feed for individual processing. The quantum computing video processing server 130 may associate time and/or sequence information to link the separated audio and video information during analysis. The video processing engine 132 may then process the real-time video feed, such as by generating a plurality of sequences of images from the video feed. Similarly, the audio processing engine 134 may process the real-time audio feed, such as by splitting the audio feed into a plurality of sequential audio clips. In some cases, metadata (e.g., time information, location information, video property information, audio property information, and the like) may be associated with each image sequence of the plurality of image sequences and each audio clip of the plurality of sequential audio clips. In some cases, a duration of an audio clip under analysis may be aligned with or otherwise equal to a duration associated with an image sequence under analysis. In some cases, the quantum computing video processing server 130 may analyze a number of different audio/video/image streams in parallel or otherwise concurrently. For example, the quantum computing video processing server may concurrently analyze an image sequence and an audio clip corresponding to a duration of a same real-time video feed, as well as historical video and/or audio images captured at the same or similar locations. Sequences of images and audio clips may be linked by a time stamp such that a video image sequence and a corresponding audio clip from the same duration of the video stream may be analyzed concurrently or nearly simultaneously based on associated time stamps, as shown in FIG. 2.

The qubit converter 136 may process one or more quantum computing conversion algorithms to convert digital information into quantum computing information, e.g., quantum bits (qubits). The qubit is the basic unit of quantum information and is analogous to the classical binary bit commonly used with a two-state digital device. In general, a qubit leverages peculiarities of quantum mechanics in a form of a two-state quantum-mechanical system. For example, a spin of an electron may have two states of spin up or spin down. Additionally, a polarization of a single photon may lead to two states of vertical polarization or horizontal polarization. While classical bits may either be 'on' ('1') or 'off' ('0'), quantum mechanics allows qubits to have a coherent superposition of both states simultaneously, which is fundamental to quantum mechanics and to quantum computing. This superposition allows qubits to hold additional information to the binary two states of '0' and '1'. In some cases, the qubit converter may process one or more algorithms to transform a pixel-based image to a corresponding quantum-pixel-based image. For example, the qubit converter 136 may convert an image to qubits using a qubit per pixel representation of each pixel's classical weight based on a quantum image matrix weight, where qubits may be defined using linear superposition and where gray scale level may correspond to a base state of the qubit. Similarly the qubit converter 136 may process one or more quantum computing algorithms to convert a digital audio signal and/or a digital representation of an analog audio signal into a quantum representation of the digital audio (QRDA) signal. For example, the qubit converter 136 may use two entangled qubit sequences to store audio amplitude and time information. In some cases, the qubit converter 136 may use a flexible representation of quantum audio (FRQA) technique. For example, the FRQA algorithm may encode the amplitude information in two's complement notation and may integrate the time component to a normalized quantum state. As such, FRQA may be more flexible for use in converting a digital audio signal to a quantum audio signal. In some cases, the qubit converter 136 may convert historical video files, image files and/or audio files retrieved from the data store 120 into quantum representations to facilitate analysis of the real-time video, image, and audio files. In some cases, the converted qubit historical image files, video files, and/or audio files may be stored in the data store 120 to save time. In some cases, the quantum representations of the historical files may be replaced or otherwise substituted by conversions using a different method, based on a quantum conversion algorithm used to convert the real time images.

The entanglement calculator 138 may calculate a video entanglement score based on a comparison between qubit formatted image from an input image sequence received from a real-time video feed and a historical image retrieved from the data store 120. In some cases, the historical image may be a previous image captured by the same video camera that captured the video stream under analysis. In some cases, the historical image may be an historical image including points of reference and/or a verified identification of criminal or malicious activity. The entanglement score may be representative of "sameness" between the two examined images. For example, if an entanglement score is high, then the corresponding probability that the compared images show similar features is greater. If an entanglement score is low, the corresponding probability that compared images show similar features is lesser. Similarly, the entanglement calculator 138 may calculate an audio entanglement score based on a comparison between the qubit formatted audio clip from the input audio signal received from a real-time video feed. In some cases, the historical audio file may comprise historical audio from the same video sequence as the analyzed image and/or may include audio verified as representative of criminal or malicious activity. The entanglement score may be representative of "sameness" between the two examined audio files. For example, if an entanglement score is high, then the corresponding probability that the compared audio files include similar audio features is greater. If an entanglement score is low, the corresponding probability that compared audio files include similar audio features is lesser. In some cases, the entanglement calculator 138 and/or the qubit converter 136 may perform some sort of quantum error correction on the converted real-time audio clips and/or converted real-time image files, and/or on converted historical audio files and/or image files. The quantum error correction may be used to protect the converted quantum information from errors due to decoherence and other quantum noise that may be introduced into the converted qubit files. Quantum error correction may be used to achieve a fault-tolerant quantum comparision engine that overcome noise on stored quantum information, but with other errors that may be introduced due to erroneous quantum conversion techniques and/or issues with video or audio capture. Error correcting codes that may be used include, but are not limited to, bit flip code, sign flip code, Shor code, bosonic codes and/or other codes or models.

The match predictor 142 may analyze the quantum entanglement score associated with an analyzed image file and/or the quantum entanglement score associated with an audio clip file to determine a probability that the image file and/or the audio clip file includes indications of criminal or malicious activity. A higher probability score may correspond to a higher likelihood that a particular image and/or audio clip includes an indication of criminal or malicious activity. In some cases, the match predictor 142 may update a probability score associated with a sequence of images. For example, when the audio signal and video signal of an incoming real-time video signal received from a video camera 112, 116, the audio signal and video signal may be split into a sequence of audio clips and a sequence of video clips. Each audio clip may be associated with a corresponding video clip associated with a same duration of the real-time video signal. For analysis, each video clip may be further split into a sequence of images, where each image of the sequence of images may be analyzed individually. In some case, the match predictor 142 may determine a probability score associated with each image file and a probability score associated with the sequence of images. In some cases, the probability score for a sequence of images may be calculated as a sum of the probability score for each image of the sequence of images, a weighted sum of the probability score for each image of the sequence of images and/or using another algorithm or function. In some cases, a probability score may be calculated as a sum or weighted sum (or using another function or algorithm) of the probability score of the audio clip and the corresponding sequence of images.

The quantum computing video processing server 130 may then analyze the probability score to determine whether an incoming real-time video stream includes indications of criminal or malicious activity. For example, the quantum computing video processing server 130 may enable the alert engine 144 to compare a probability score of a qubit audio clip to one or more audio thresholds, a probability score of a qubit image file to one or more image thresholds, a probability score of a qubit image sequence to one or more sequence thresholds, and/or a combined probability score of an audio clip and a corresponding image sequence to one or more combined audio clip and image sequence thresholds. In some cases, the one or more thresholds may be used to indicate a high probability that criminal or malicious activity is occurring in real-time with the qubit analysis of the real-time video signal. In some cases a high threshold (e.g., about 80% to about 90%) may indicate a high probability that criminal or malicious activity is happening in real time, a medium threshold (e.g., about 70% to about 80%) may indicate that criminal or malicious activity may be occurring, but additional investigation may be required.

In cases when an alert meets a threshold, the alert engine 144 may initiate one or more alarm sequences that may include locking of doors in the vicinity of the video camera, disabling of one or more devices (e.g., self-service transaction device 114), initiating an visual and/or audio alarm in the vicinity of the video camera 112, 116 that is the source of the analyzed real-time video feed, and/or sending an alert to a security or law enforcement computing system indicating a real-time indication of criminal or malicious activity has been captured on video and including a geographic location, a time stamp and/or other information associated with the video camera and/or video feed. In some cases, an alert message may include a copy of the analyzed video clip. In some cases, the alert engine 144 may receive feedback based on whether an alert was sent or not sent and may include an indication of the feedback as metadata associated with an archived copy of the incoming video feed that may be stored in the data store 120. In some cases, the feedback may include an indication that the alert was correctly issued, an indication that the alert was incorrectly indicated, an indication that the alert corresponded to an emergency condition, and/or the like. In some cases, the alert engine may generate a message to an internal security team to further analyze an image and/or audio clip when the probability score is near to matching a lowest threshold level. In some cases, quantum computing video processing server 136 may be configured to identify an indication that an individual may be experiencing a health-related emergency in a similar manner as described above. The alert engine 144 may communicate an alert message via an emergency alert system when the match predictor identifies an indication of a health-related emergency.

FIG. 2 shows an illustrative process flow 200 for performing quantum computing-based video analysis and alert generation in accordance with one or more aspects described herein. The process flow 200 for quantum computing-based video analysis and alert generation may include one or more processes that may occur concurrently or nearly concurrently. For example, the process flow 200 may include process flow 201 for receiving and/or converting historical files into qubit files for further analysis, process flow 203 for analyzing an image of a sequence of images corresponding to a real-time video clip, and process flow 205 for analyzing an audio clip corresponding to a same time duration as the real-time video clip.

At 202, the quantum computing video processing server 130 may receive historical video files, audio files, and/or image files that may correspond to images received from the one or more video cameras 112, 116, from video cameras in similar locations to those of the video cameras 112, 116, and/or may include indications of verified criminal or malicious activity. The quantum computing video processing server 130 may then convert the historic file into qubit files at 204 and may store the converted qubit files (e.g., qubit image files, sequences of qubit image files, qubit audio files and the like) in the data store 120 for use in further analysis of real-time video streams.

At 210, the video processing engine 132 of the quantum computing video processing server 130 may receive from one or more video cameras 112, 116 a real-time video stream. In some cases, the video stream may be received in near real-time and/or may be previously recorded. At 214, the video processing engine 132 and the audio processing engine 134 of the quantum computing video processing server 130 may extract a real-time audio stream from the real-time video stream to provide an isolated real-time audio stream and an isolated real-time video stream. Once separated, the quantum computing video processing server 130 may process the isolated real time audio stream and the isolated real-time video stream in parallel. At 220, the video processing engine 132 of the quantum computing video processing server 130 may convert the isolated video stream into segments of a set duration and the audio processing engine 134 of the quantum computing video processing server 130 may further convert the isolated audio stream into a plurality of audio clips of the same set duration. Each video steam segment of the isolated video stream may further be converted into a sequence of images. At 222, the qubit converter 136 may convert an image snapshot of the sequence of images into qubits using a qubit conversion algorithm. For example, the image may be converted pixel by pixel to a quantum pixel image.

At 224, an entanglement score may be calculated by the entanglement calculator 138 based on a quantum pixel by quantum pixel comparison between the quantum pixel image and a historical quantum pixel image. At 226, one or more quantum error correction techniques may be performed to correct for inadvertent errors introduced into the quantum pixel image. At 228, the match predictor 142 may generate a probability of criminal activity based on the snapshot entanglement score. For example, if the entanglement score is above a specified threshold a probability score may be assigned based on an amount above or below the threshold. In some cases, the probability score may be calculated based on a formula corresponding to the entanglement score based on the measurement postulate of quantum mechanics. At 230, the probability score for the video sequence may be updated based on the probability score of the currently analyzed image, such as by summing the probability scores, averaging the probability scores, calculating a weighted sum or weighted average of the probability scores for all images in the image sequence. At 235, the image sequence threshold may be analyzed to determine whether one or more thresholds have been met. For example, if a low threshold condition has been met or no threshold condition has been met, a next image of the image sequence may be selected and the video analysis sequence repeats until the all images of a particular image sequence has been analyzed. If, at 235, a threshold condition has been met then a combined cumulative alert probability score may be determined based on the combined image sequence probability score and the audio clip probability score at 250.

Returning to 240, the corresponding audio clip may be converted into a quantum representation of the audio clip by the qubit converter 136 and audio metadata may be associated with the qubit clip, such as time, amplitude and duration information at 242. In some cases, the qubit conversion of the audio signal is based on a quantum calculation using the amplitude and duration information. At 244, an entanglement score may be calculated based on a comparison with a historical audio clip qubit representation by the entanglement calculator 138. At 246, a probability score corresponding to a likelihood that criminal or malicious activity may be occurring is generated by the match generator 142. At 247, the probability score for the audio clip may be analyzed to determine whether one or more thresholds have been met. For example, if no threshold or a low threshold condition has been met, processing may stop so that the next video segment (e.g., audio clip and video image sequence) may be analyzed at 260. If, at 247, the audio threshold has been met, a cumulative alert probability may be determined based on a combination of the audio alert probability score and a cumulative image sequence probability score at 250. If at, 255 a probability threshold has been met, an alert may be generated by the alert engine at 256. Optionally or additionally, at 235 a higher probability threshold condition has been met (e.g., above about 90%) then an alert may be generated at 256.

In some cases, the alert may be an audio and/or visual alarm at the CCTV camera location, an emergency message sent to a law enforcement facility near the vicinity of the CCTV camera, an alert to building security at which the CCTV camera is located, or the like. In some cases, if the alert is validated, the captured video and/or audio may be added to the historical image data store for future comparisons.

Figure 3:
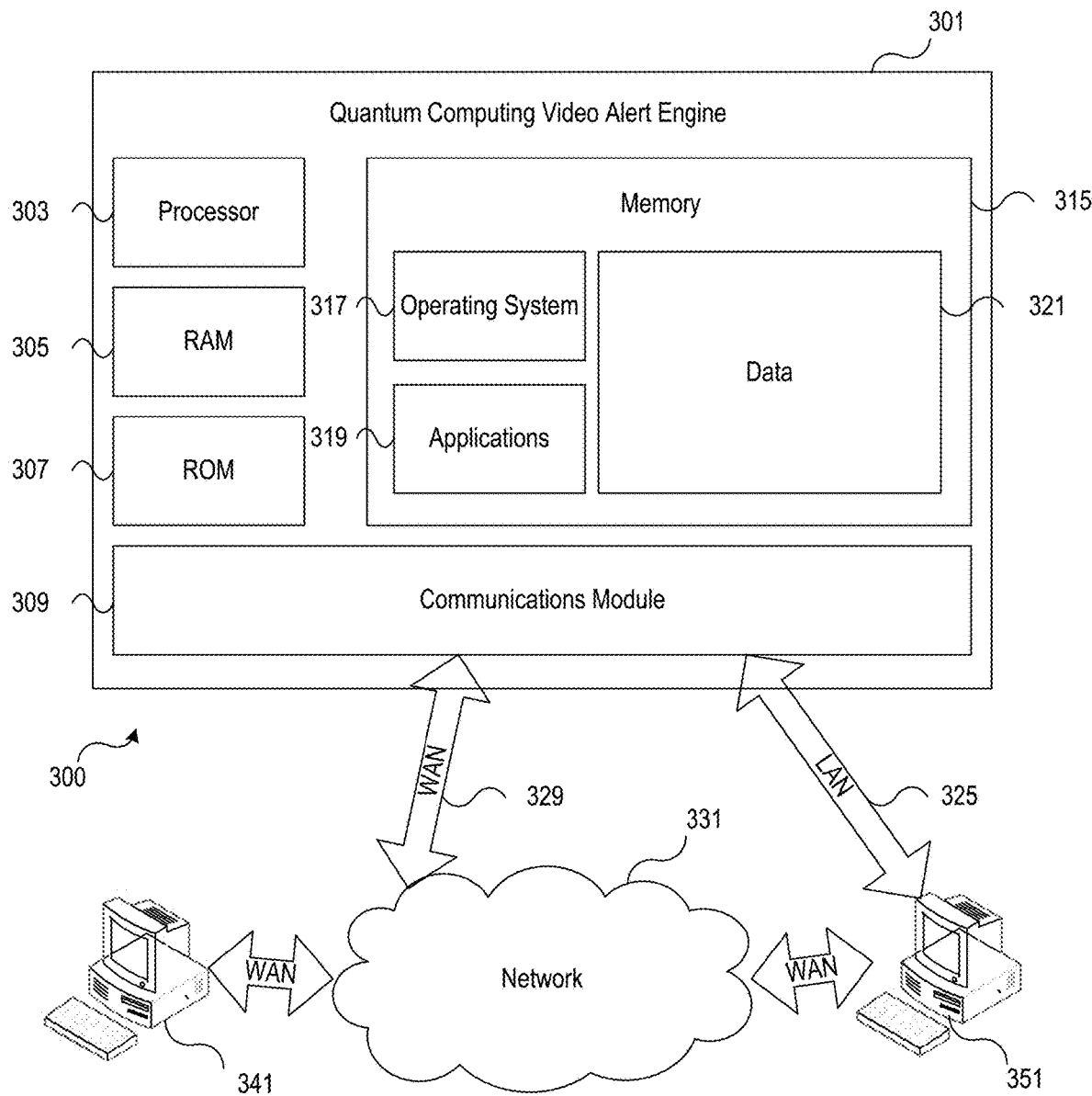
FIG. 3 shows an illustrative operating environment in which various aspects of the disclosure may be implemented in accordance with one or more aspects described herein.

FIG. 3 shows an illustrative operating environment in which various aspects of the present disclosure may be implemented in accordance with one or more example embodiments. Referring to FIG. 3, a computing system environment 300 may be used according to one or more illustrative embodiments. The computing system environment 300 is only one example of a suitable computing environment and is not intended to suggest any limitation as to the scope of use or functionality contained in the disclosure. The computing system environment 300 should not be interpreted as having any dependency or requirement relating to any one or combination of components shown in the illustrative computing system environment 300.

The computing system environment 300 may include an illustrative quantum computing video alert engine 301 having a processor 303 for controlling overall operation of the homomorphic encryption threat analysis engine 301 and its associated components, including a Random-Access Memory (RAM) 305, a Read-Only Memory (ROM) 307, a communications module 309, and a memory 315. The quantum computing video alert engine 301 may include a variety of computer readable media. Computer readable media may be any available media that may be accessed by the quantum computing video alert engine 301, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the quantum computing video alert engine 301.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 303 of the quantum computing video alert engine 301. Such a processor may execute computer-executable instructions stored on a computer-readable medium.

Software may be stored within the memory 315 and/or other digital storage to provide instructions to the processor 303 for enabling the quantum computing video alert engine 301 to perform various functions as discussed herein. For example, the memory 315 may store software used by the quantum computing video alert engine 301, such as an operating system 317, one or more application programs 319, and/or an associated database 321. In addition, some or all of the computer executable instructions for the quantum computing video alert engine 301 may be embodied in hardware or firmware. Although not shown, the RAM 305 may include one or more applications representing the application data stored in the RAM 305 while the quantum computing video alert engine 301 is on and corresponding software applications (e.g., software tasks) are running on the quantum computing video alert engine 301.

The communications module 309 may include a microphone, a keypad, a touch screen, and/or a stylus through which a user of the quantum computing video alert engine 301 may provide input, and may include one or more of a speaker for providing audio output and a video display device for providing textual, audiovisual and/or graphical output. The computing system environment 300 may also include optical scanners (not shown).

The quantum computing video alert engine 301 may operate in a networked environment supporting connections to one or more remote computing devices, such as the computing devices 341 and 351. The computing devices 341 and 351 may be personal computing devices or servers that include any or all of the elements described above relative to the quantum computing video alert engine 301.

The network connections depicted in FIG. 3 may include a Local Area Network (LAN) 325 and/or a Wide Area Network (WAN) 329, as well as other networks. When used in a LAN networking environment, the quantum computing video alert engine 301 may be connected to the LAN 325 through a network interface or adapter in the communications module 309. When used in a WAN networking environment, the quantum computing video alert engine 301 may include a modem in the communications module 309 or other means for establishing communications over the WAN 329, such as a network 331 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 4:
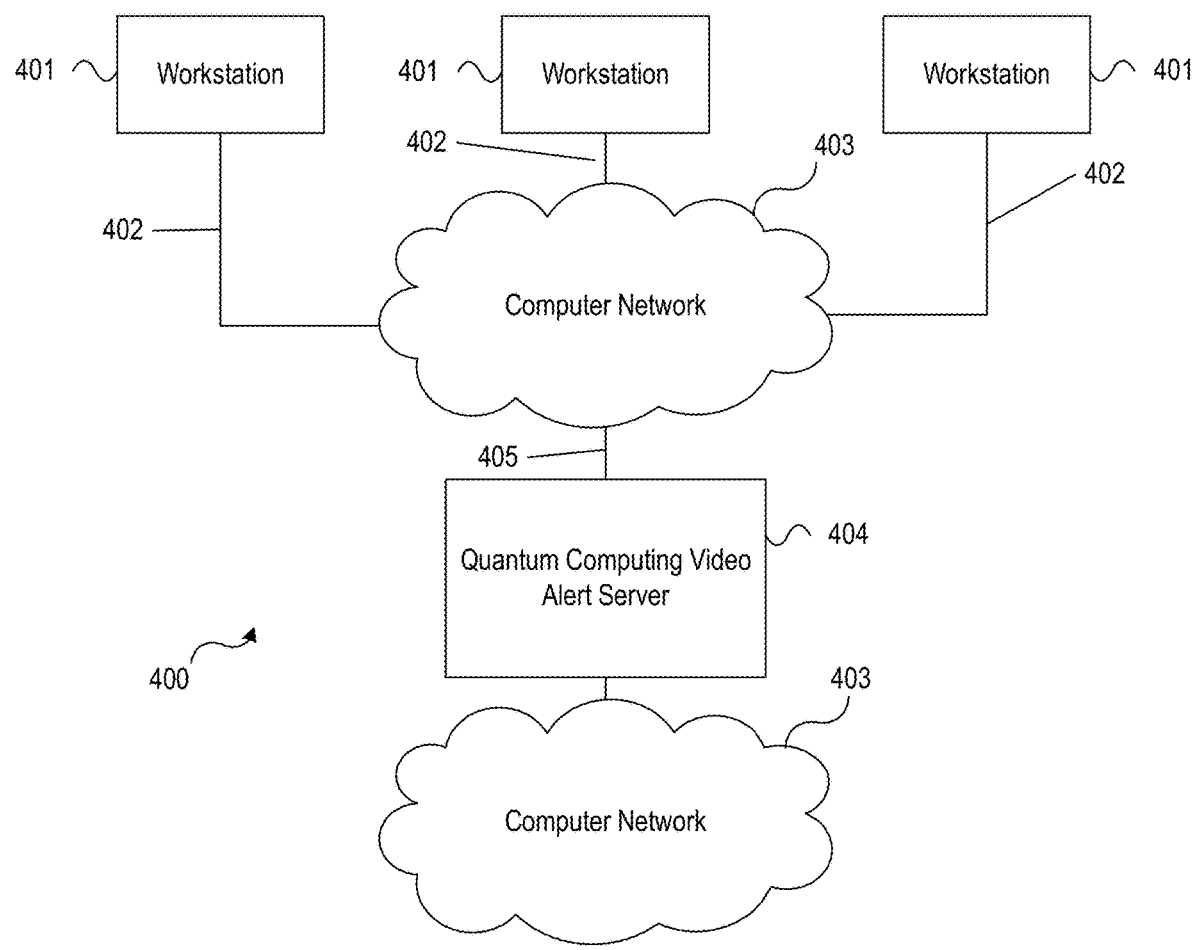
FIG. 4 shows an illustrative block diagram of workstations and servers that may be used to implement the processes and functions of certain aspects of the present disclosure in accordance with one or more aspects described herein.

FIG. 4 shows an illustrative block diagram of workstations and servers that may be used to implement the processes and functions of certain aspects of the present disclosure in accordance with one or more example embodiments. For example, an illustrative system 400 may be used for implementing illustrative embodiments according to the present disclosure. As illustrated, the system 400 may include one or more workstation computers 401. The workstation 401 may be, for example, a desktop computer, a smartphone, a wireless device, a tablet computer, a laptop computer, and the like, configured to perform various processes described herein. The workstations 401 may be local or remote, and may be connected by one of the communications links 402 to a computer network 403 that is linked via the communications link 405 to a quantum computing video alert server 404. In the system 400, the quantum computing video alert server 404 may be a server, processor, computer, or data processing device, or combination of the same, configured to perform the functions and/or processes described herein. The quantum computing video alert server 404 may be used to monitor real-time audio and/or video signals captured live at an enterprise facility and may perform real time analysis of the signals via quantum computing entanglement with verified historical video and/or audio signals that show suspected criminal or malicious activity.

The computer network 403 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 402 and 405 may be communications links suitable for communicating between the workstations 401 and the quantum computing video alert server 404, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. Non-transitory Computer readable media storing instructions that, when executed by a processor, cause a computing device to:

receive, via a network, a real-time audio/video (A/V) signal from an enterprise facility location;

convert the real-time A/V signal into a sequence of paired video snapshots and audio clips;

convert, for each paired video snapshot and audio clip, into qubits;

calculate, for each paired video snapshot and audio clip, a quantum entanglement score based on a comparison to historical video snapshots and audio snapshots;

calculate, based on each entanglement score, a probability score; and generate, based on a probability threshold being met, an alert that suspicious activity has been identified at a location.

2. The non-transitory computer readable media of claim 1, wherein the instructions to generate the alert further cause the computing device to send, via a network, a message comprising a video sequence corresponding to the probability score.

3. The non-transitory computer readable media of claim 1, wherein the instructions to further cause the computing device to convert the audio clip into qubits based on amplitude values and duration values of the audio signal.

4. The non-transitory computer readable media of claim 1, wherein the instructions to further cause the computing device to capture the real-time A/V signal at an enterprise facility location.

5. The non-transitory computer readable media of claim 1, wherein the real-time A/V signal is captured by a video camera of a self-service transaction device.

6. The non-transitory computer readable media of claim 1, wherein the alert includes disabling a self-service transaction device.

7. An apparatus comprising:
a quantum computing processor;
memory storing instructions that, when executed by the quantum computing processor, cause the apparatus to:
split a real-time video recording into a video signal and a corresponding audio signal;
convert a real-time audio/video (A/V) signal into a sequence of video snapshots and corresponding audio clips;
convert each video snapshot and corresponding audio clip of the sequence of video snapshots and corresponding audio clips into qubits;
calculate, each video snapshot and corresponding audio clip of the sequence of video snapshots and corresponding audio clips, a quantum entanglement score based on a comparison to historical video snapshots and historical audio snapshots;
calculate a malicious activity probability score, based on the entanglement score for paired video snapshots and audio clips; and
generate, based on a probability threshold being met, an alert that malicious activity has been identified at a location.

8. The apparatus of claim 7, wherein the instructions cause the apparatus to send, via a network, a message comprising a video sequence corresponding to the probability score.

9. The apparatus of claim 7, wherein the instructions cause the apparatus to send, via a network, a message comprising an audio sequence corresponding to the probability score.

10. The apparatus of claim 7, wherein the instructions cause the apparatus to send, via a network, a message comprising one or both of the video sequence and an audio sequence corresponding to the probability score.

11. The apparatus of claim 7, wherein the instructions cause the apparatus to cause capture of the real-time video recording at an enterprise facility location.

12. The apparatus of claim 7, wherein the real-time video recording is captured by a video camera of a self-service transaction device.

13. The apparatus of claim 7, wherein the instructions cause the apparatus to convert the audio clip into qubits based on amplitude values and duration values of the audio signal.

14. The apparatus of claim 13, wherein the instructions cause the apparatus to send a command to disable a self-service transaction device.

15. A system comprising:
a recording device configured to capture a real-time audio/video (A/V) recording;
a quantum computing device comprising:
a quantum computing processor;
memory storing instructions that, when executed by the quantum computing processor, cause the quantum computing device to:
split the real-time A/V recording into a video signal and a corresponding audio signal;
convert the video signal and the audio signal into a sequence of paired video snapshots and audio clips;
convert each paired video snapshot and audio clip into qubits;
calculate, for each paired video snapshot and audio clip, a quantum entanglement score based on a comparison to historical video snapshots and historical audio snapshots;
calculate a probability score based on the entanglement score for each paired video snapshot and audio clip; and
generate, based on a probability threshold being met, an alert.

16. The system of claim 15, wherein the instructions cause the quantum computing device to send, via a network, a message comprising a video sequence corresponding to the probability score.

17. The system of claim 15, wherein the instructions cause the quantum computing device to convert the audio clip into qubits based on amplitude values and duration values of the audio signal.

18. The system of claim 15, wherein the instructions cause the quantum computing device to cause capture of the real-time video recording at an enterprise facility location.

19. The system of claim 15, wherein video recording device is located adjacent to a self-service transaction device.

20. The system of claim 19, wherein the instructions cause the quantum computing device to send a command to disable the self-service transaction device.

* * * * *